Aug. 28, 1956
J. BERGER
2,760,406
THREE COMPONENT PHOTOGRAPHIC OBJECTIVE
Filed July 8, 1953
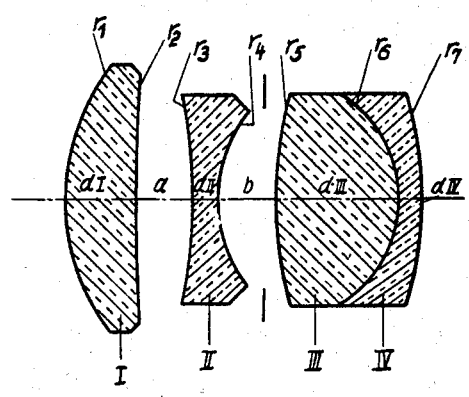

United States Patent Office 2,760,406
Patented Aug. 28, 1956

2,760,406

THREE COMPONENT PHOTOGRAPHIC OBJECTIVE

Johannes Berger, Heidenheim (Brenz), Germany, assignor to Carl Zeiss, Heidenheim (Brenz), Germany Application July 8, 1953, Serial No. 366,666

Claims priority, application Germany July 24, 1952

1 Claim. (Cl. 88—57)

Photographic objectives are known, consisting of three components separated by air spaces, namely of a collective front component, of a single biconcave middle lens, and of a collective rear component, which consists of two lenses of opposite refractive power cemented together, whereat the concave side of the cemented surface is directed towards the diaphragm located between the second and the third component and whereat said biconcave middle lens is of unsymmetrical shape in such manner that the radius of the surface turned away from the diaphragm is at least twice as long in amount as the radius of the surface of said middle lens facing the diaphragm. Such objectives in general are characterized thereby, that they show a relatively small spherical zonal error, so that one can keep the aperture error of the middle pencil very small. In order to also with these forms be able to exert to the outer rays of the oblique pencils, a particularly strong convergent effect and therewith to diminish the apertural defect for these oblique pencils, it is advisable in accordance with the invention, in the said front collective meniscus shaped lens component to have the radius of the refractive surface directed towards the middle lens component shorter than the 10-fold amount of the objective focal length, and to have the biconcave middle lens component unsymmetrical to an extent that the radius of curvature of the refractive surface turned away from the diaphragm is at least three times as long as the radius of the lens surface facing the diaphragm and likewise longer than 80 percent of the objective focal length, and to give the cemented surface a relatively large distance from the diaphragm, namely so large that the vertex distance between the surface of the biconcave middle lens facing the diaphragm and the cemented surface of the rear component is greater than 25% of the objective focal length, and also greater than 115% of the absolute amount of the radius of the cemented surface.

A preferred practical construction of objective according to the invention is illustrated in the accompanying drawing figure, and numerical data for this construction are given in the following table in which $r_1, r_2 \ldots$ represent the radii of curvature of the individual surfaces counting from the front (the positive sign indicating that the surface is convex and the negative sign that it is concave thereto), $d_{\mathrm{I}}, d_{\mathrm{II}} \ldots$ represent the axial thickness of the various elements and $a$, $b$, represent the axial air separations between the components. The table also gives the mean refractive indices for the D-line and the Abbe numbers $V_D$ of the materials used for the individual elements.

This execution example of an objective conformable to the invention is computed for a focal length of about $f=100$ and has a relative aperture of 1:2 with an image angle of $\pm 14°$, which is preponderantly intended for small focal lengths.

Example

| Radii | Thicknesses and spaces | $n_D$ | $V_D$ |
|---|---|---|---|
| $r_1 = +41.567$ | $d_I = 14.0$ | 1.69100 | 54.8 |
| $r_2 = +434.01$ | $a = 11.0$ | | |
| $r_3 = -100.00$ | $d_{II} = 5.0$ | 1.64831 | 33.8 |
| $r_4 = +27.384$ | $b = 11.3$ | | |
| $r_5 = +77.179$ | $d_{III} = 24.0$ | 1.69100 | 54.8 |
| $r_6 = -23.714$ | $d_{IV} = 5.0$ | 1.60729 | 49.2 |
| $r_7 = -69.783$ | | | |

I claim:

Spherically, comatically, chromatically and astigmatically corrected objective consisting of three components axially air separated apart, namely a front collective meniscus shaped component formed of a simple lens, a dispersive biconcave middle lens component formed of a simple lens, and a collective rear component comprising two individual simple lens elements of opposite refractive power cemented together, the concave side of the cemented surface being directed towards the diaphragm located between the second and the third components, the said front collective meniscus shaped lens component with a radius of the refractive surface directed towards the middle lens being shorter than the 10-fold amount of the objective focal length, and with the biconcave middle lens component being of unsymmetrical shape with the radius of curvature of the refractive surface turned away from the diaphragm being at least three times as long as the radius of the lens surface facing the diaphragm and likewise longer than 80 percent of the objective focal length, and with a vertex distance between the refractive surface of the middle component facing the diaphragm and the cemented surface of the rear doublet component being greater than 25 percent of the objective focal length and likewise greater than 115 percent of the absolute amount of the radius of the said cemented surface.

References Cited in the file of this patent

UNITED STATES PATENTS

| 2,158,178 | Frederick et al. | May 16, 1939 |
| 2,165,328 | Aklin et al. | July 11, 1939 |
| 2,502,508 | Cook | Apr. 4, 1950 |